US005768527A

United States Patent [19]
Zhu et al.

[11] Patent Number: 5,768,527
[45] Date of Patent: Jun. 16, 1998

[54] DEVICE, SYSTEM AND METHOD OF REAL-TIME MULTIMEDIA STREAMING

[75] Inventors: Qin-Fan Zhu, Mansfield; Manickam R. Sridhar, Holliston; M. Vedat Eyuboglu, Concord, all of Mass.

[73] Assignee: Motorola, Inc., Schaumburg, Ill.

[21] Appl. No.: 636,417

[22] Filed: Apr. 23, 1996

[51] Int. Cl.$^6$ .............................. H04L 11/20; H04J 3/24
[52] U.S. Cl. ...................... 395/200.61; 395/200.6; 455/18; 455/70; 370/229; 370/231
[58] Field of Search ................ 395/200.01, 200.02, 395/200.13, 200.61, 200.62, 200.65, 200.6; 370/231–232, 229–230, 241, 473; 371/32; 455/500, 507, 510, 18, 13.1, 70

[56] References Cited

U.S. PATENT DOCUMENTS

| | | |
|---|---|---|
| 5,153,877 | 10/1992 | Esaki et al. . |
| 5,295,154 | 3/1994 | Meier et al. . |
| 5,367,523 | 11/1994 | Chang et al. . |
| 5,394,436 | 2/1995 | Meier et al. . |
| 5,428,636 | 6/1995 | Meier . |
| 5,446,734 | 8/1995 | Goldstein . |
| 5,475,688 | 12/1995 | Bridgewater et al. . |
| 5,504,746 | 4/1996 | Meier . |
| 5,521,979 | 5/1996 | Deiss . |
| 5,650,993 | 7/1997 | Lakshman et al. . |
| 5,664,028 | 9/1997 | Blonstein et al. . |

FOREIGN PATENT DOCUMENTS

| | | |
|---|---|---|
| 00275678A1 | 7/1988 | European Pat. Off. . |
| 00281334A2 | 9/1988 | European Pat. Off. . |
| 63-0250945 | 10/1988 | Japan . |

OTHER PUBLICATIONS

Zeng, et al., "Directional Spatial Interpolation for DCT-based Low Bit Rate Coding", <URL:http//www.ee.princeton.edu/~wzeng/lbr.html>, IEEE Inter. Conf. Acoustic, Speech, and Signal Processing, Atlanta, GA, May 1996.

World Wide Web Consortium, "Solaris 2.5 and Solaris 2.4 patch 101945-34+ have poor TCP performance over slow links" <URL:http//sunsite.csi.forth.gr/sunsite/mirror1/sol2_faq/Q5.49.html>.

Hassan Peyravi, "Announced Retransmission Random Access (ARRA)" <URL:http//mars.mcs.kent.edu/mac/node66.html> World Wide Web Consortium, Dec. 19, 1996.

Cisco Systems Inc. "Building Consistent Quality of Service into the Network," World Wide Web Consortium <URL:http//www.cisco.com/warp/public/674/6.html>, The Business of Multimedia Networking, Mar. 3, 199.

L. Kleinrock, et al. "Packet Switching in Radio Channels; Part IV—Stability Considerations & Dynamic Control in Carrier Sense Multiple Access", IEEE Trans. on Comm., vol. COM-25, No. 10, Oct. 1977.

Pursley, "The role of Spread Spectrum in Packet Radio Networks", Proc. of the IEEE, vol. 75, No. 1, Jan. 1987.

Onunga, et al. "Performance Analysis of CSMA with Priority Acknowledgments (CSMA/PA) on Noisy Data Networks with Finite User Population", IEEE Trans. on Comm., vol. 39, No. 7, Jul. 1991.

Kleinrock, et al. "Spatial Rouse in Multihop Packet Radio Networks", Proceedings of the IEEE, vol. 75, No. 1, Jan. 1987.

"Real Time Video and Audio in the World Wide Web", Zhigang Chen, See–Mong Tan, Roy H. Campbell and Yongcheng Li no date.

"Coding and Cell–Loss Recovery in DCT–Based Packet Video", Qin–Fan Zhu, Yao Wang, and Leonard Shaw, IEEE Transactions on Circuits and Systems for Video Technology, vol. 3., No. 3, Jun. 1993, pp. 248–258.

Primary Examiner—James P. Trammell
Assistant Examiner—Cuong H. Nguyen
Attorney, Agent, or Firm—Jordan C. Powell

[57] ABSTRACT

The present invention provides a device (200, 300), system (400, 500) and method for real-time streaming of a multimedia file stored in a remote server over a packet network to a multimedia client connected to the same network via a low-speed access link such as an analog telephone line. The invention operates to provide significantly improved QoS with respect to both quality and delay.

59 Claims, 9 Drawing Sheets

1106: SENDING, UTILIZING THE QoS MANAGER, RETRANSMISSION REQUESTS TO THE REMOTE SERVER, WHEREIN SAID RETRANSMISSION REQUESTS ARE SENT UPON DETECTION OF A LOST PACKET AND REQUEST THE RETRANSMISSION OF MULTIPLE COPIES OF THE LOST PACKET, AND WHEREIN A NUMBER OF MULTIPLE COPIES REQUESTED IS IN ACCORDANCE WITH AN IMPORTANCE OF THE LOST PACKET

1202: WHEREIN THE NUMBER OF COPIES REQUESTED FURTHER DEPENDS ON A REMAINING NUMBER OF RETRANSMISSION ATTEMPTS ALLOWED FOR THE LOST PACKET

1204: WHEREIN THE REMAINING NUMBER OF RETRANSMISSION ATTEMPTS ALLOWED FOR THE LOST PACKET IS OBTAINED BY DIVIDING A DIFFERENCE BETWEEN A PRESENTATION TIME OF THE PACKET AND A CURRENT TIME BY A ROUNDUP DELAY BETWEEN THE CLIENT DEVICE AND THE REMOTE SERVER

1206: WHEREIN THE MULTIPLE COPIES OF THE RETRANSMISSION REQUEST ARE SENT BY THE CLIENT TO THE REMOTE SERVER

1208: WHEREIN THE MULTIPLE NUMBER OF COPIES REQUESTED FURTHER DEPENDS ON A BANDWIDTH BUDGET AND AN END-TO-END INFORMATION LOSS RATE

1210: WHEREIN THE QoS MANAGER FURTHER SENDS RATE CONTROL MESSAGES TO THE REMOTE SERVER TO CONTROL THE BIT RATE OF THE INFORMATION STREAM, AND WHERE SAID RATE CONTROL MESSAGES ARE SENT USING A PREDETERMINED SCHEME BASED ON SAID RETRANSMISSION REQUESTS, THE BANDWIDTH BUDGET AND THE END-TO-END INFORMATION LOSS RATE

1212: WHEREIN THE SAID NUMBER OF COPIES FOR RETRANSMISSION AND THE RATE CONTROL MESSAGES ARE SENT BASED ON THE FOLLOWING RELATIONSHIP:

$$R' + \sum_{1 \leq i \leq M} \left( \sum_{1 \leq j \leq L_i} q^j C_{ij} \right) R'_i \leq G,$$

WHERE
- $M$ IS A NUMBER OF THE SUBSTREAMS THE ORIGINAL MULTIMEDIA FILE CONTAINS;
- $L_i$ IS A NUMBER OF RETRANSMISSION ATTEMPTS FOR SUBSTREAM $i$;
- $q$ IS THE END-TO-END INFORMATION LOSS RATE;
- $C_{ij}$ IS THE NUMBER OF COPIES FOR RETRANSMISSION FOR SUBSTREAM $i$ IN THE $j$TH RETRANSMISSION ATTEMPT;
- $R'_i$ IS THE STREAMING BIT RATE OF SUBSTREAM $i$;
- $R' = \sum_{1 \leq i \leq M} R'_i$;
- $G$ IS THE BANDWIDTH BUDGET AT THE SERVER

DEVICE, SYSTEM AND METHOD OF REAL-TIME MULTIMEDIA STREAMING

FIELD OF THE INVENTION

This invention relates generally to real-time multimedia communications, and more particularly to real-time multimedia streaming over packet data networks.

BACKGROUND OF THE INVENTION

There is a growing need for carrying real-time multimedia traffic (voice, audio, video) over packet data networks such as Local Area Network's (LAN's), frame relay and Internet. These networks are designed primarily for data traffic, and do not provide the necessary quality of service (QoS) guarantees for reliable real-time multimedia communication.

Real-time multimedia applications may be divided into two types: two-way interactive multimedia and one-way streaming multimedia. In one-way streaming, the information flow is largely one-way from a server to a client, except for information sent by the client to control the streaming (e.g., VCR-like controls such as fast forward, reverse, retransmission requests, etc.). The end-to-end delay requirements are less stringent for one-way streaming than for two-way interactive multimedia, but are more strict than for non real-time data applications.

A significant impediment to reliable multimedia streaming on packet data networks is packet loss. Packet loss lo occurs because of limited buffering and processing capabilities of network nodes, and to a lesser extent because of bit errors on physical links.

For data traffic, many retransmission protocols have been developed to recover lost packets (e.g., TCP). The well-known retransmission scheme of TCP (Transport Control Protocol) uses positive acknowledgment messages sent by the receiver coupled with sender time-outs to determine when a retransmission is required. Since TCP sends a positive acknowledgment only when a packet is received in sequence, several packets will often be retransmitted after a time-out, thereby increasing the overhead. The TCP protocol also uses tight flow control to avoid buffer overflow in receiving clients. For these reasons, TCP is not well-suited for multimedia streaming.

Another problem encountered in carrying real-time multimedia traffic over existing data networks is delay jitter caused by variations in delay suffered by packets that traverse the network. Since real-time multimedia requires continuous playback, such delay jitter may lead to serious quality degradations due to buffer overflow or underflow in the client. In one-way multimedia streaming, such delay jitter may be compensated by buffering a portion of the incoming stream prior to the start of playback.

In prior art, there are three known approaches to streaming multimedia information from a server to a client over a packet data network:

In the first approach, existing data transmission protocols are used to download the entire multimedia file from the server to the client and then play the file locally. The problem with this approach is that even for moderately long multimedia files, the user has to wait for a long period of time before the start of playback.

In the second approach, multimedia information is streamed from the server to the client, but no retransmission is used to recover lost packets. The client can now start playing the multimedia stream almost immediately. Although this eliminates the long initial delay of the first approach, it fails to provide adequate QoS, because of the significant degradation in signal quality caused by packet loss.

A third approach was described in a recent article which appeared in the Proceedings of the Fourth International World Wide Web Conference, 1995. This article by Z. Chen, S.-M. Tan, R. H. Campbell and Y. Li titled "Real Time Video and Audio in the World Wide Web," describes a retransmission scheme to improve the QoS. In this method, the receiver detects when packets are lost, and depending on the video frame lost (I, B or P-frame), it requests a retransmission. In this scheme, the client also controls the bitrate of the streaming based on the packet loss rate. Although the retransmission scheme used in this approach will improve the QoS compared to the other two approaches, it still does not provide adequate protection against packet loss, when the packet loss rate is very high, and retransmissions often result in failure.

Figure 1:
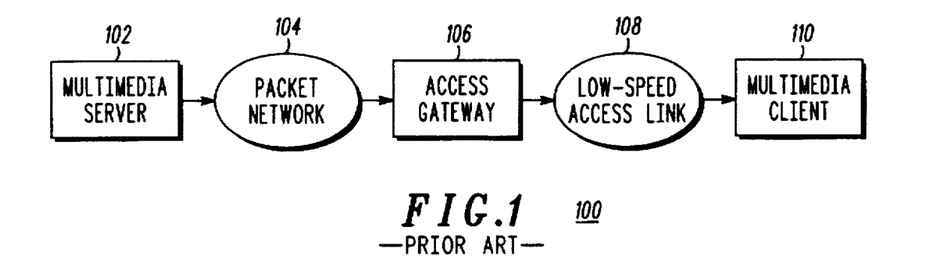
FIG. 1 is a block diagram of a generic multimedia streaming system as is known in the art.

Another obstacle to multimedia streaming lies in the low-speed access links when the client is connected to the data network with a low-speed access link. Residential or small business users may have to use the analog telephone network, also known as the Public Switched Telephone Network (PSTN), or the Integrated Service Digital Network (ISDN) to access the packet network. These access links provide very low transmission speeds and limit the quality of multimedia streaming. In addition, on modem links bit errors may occur fairly frequently. FIG. 1, numeral 100, shows a typical network configuration in which a multimedia server (102) is attached to a high-speed packet data network (104), such as frame relay or the Internet, via a high-speed link (e.g., a T1 link) (106). A client (or user) (110), attached to the same packet network via a low-speed link (e.g., PSTN or ISDN) (108), accesses multimedia files stored on the server. The packet network has high probability of packet loss and high delay jitter.

In the configuration shown in FIG. 1, it is highly desirable to utilize all the available bandwidth on the client's access link by streaming the multimedia information at the maximum rate available on that link. However, this contradicts the need for retransmissions, since repeated transmissions usually require additional bandwidth and should be used judiciously. At the same time, delay requirements in multimedia streaming demand speedy recovery of the lost information. None of the prior art schemes described above are designed to deal with these issues.

A retransmission protocol for recovering lost packets in real-time multimedia communication is described in a recent ITU-T Recommendation called H.223, Multiplexing Protocol for Low Bit Rate Multimedia Communication, November 1995. This protocol is designed for communication over point-to-point PSTN links, and is not directly applicable to communication over packet data networks which exhibit high rates of packet loss. Furthermore, an important requirement of the retransmission scheme used in H.223 is that the sender be able to adjust its streaming rate to ensure that the retransmissions together with continuous streaming do not exceed the capacity of the point-to-point link. In the case of communication over packet data networks, the server is usually not aware of the loading on the access link that connects the client to the network, and therefore cannot automatically adjust its speed. Hence, the protocol used in H.223 is not applicable to multimedia streaming over a packet network.

Thus there is a need for a device, system and method for real-time multimedia streaming over a packet network with improved QoS in general, and more particularly when the client is connected to the packet network via a low-speed access link.

BRIEF DESCRIPTION OF THE DRAWINGS

FIG. 12 is a flow chart showing additional selectable modifications for step C of FIG. 11, in accordance with the present invention.

DETAILED DESCRIPTION OF A PREFERRED EMBODIMENT

The present invention provides a scheme for real-time streaming of a multimedia file stored in a remote server over a packet network to a multimedia client. The invention provides a multimedia client device that implements a QoS manager that, together with a packet buffer, a packet processor and a robust multimedia player, operates to provide significantly improved QoS with respect to both quality and delay.

The multimedia file is transmitted in packets, each packet having at least a header and an information field. Depending on the specific protocol in use, a packet may be of fixed or variable length. The header of a packet contains at least a field called sequence number (SN). For consecutively transmitted packets, the SNs may be consecutive. Copies of transmitted packets are stored in a buffer at the server to facilitate retransmission. The size of the buffer is predetermined and depends on the roundtrip delay and the intended number of retransmission attempts.

The rate of streaming from the server may be controlled by the client based at least on a predetermined bandwidth budget at the server and an estimated information loss rate on the packet network. The bandwidth budget may be carried over from the server to the client at the start of the streaming session. The information loss rate on the packet network is estimated using methods to be described later. The client plays out the multimedia file as it receives the file in real time. The delay jitter introduced by the packet network is smoothed out at the client by using a smoothing buffer.

Lost packets are recovered using retransmission. As a key part of this invention, retransmission decisions may involve retransmission of multiple copies of a lost packet in order to speed up recovery and thereby reduce the error recovery delay. The number of copies requested for retransmission may be based on the importance of lost multimedia information. In addition, the number of copies requested for retransmission may also be based on the remaining number of allowed retransmission attempts for the lost packet. In one preferred embodiment of the present invention, the streaming rate of the server and retransmission decision is determined in the client based at least on the predetermined bandwidth budget and the estimated information loss rate on the packet network.

Because the reverse channel from the client to the server is lossy too, in general, the retransmission requests are sent with multiple identical copies to increase the probability that at least one copy for each retransmission request is carried to the server. An error concealment scheme may be used to reduce the effect of any non-recoverable packets on the quality of the delivered multimedia information.

In an alternative embodiment of the present invention, upon detection of a packet loss, the identity about the lost packet is sent to the server, and the server then makes the decisions about the streaming rate and number of copies for retransmission to optimize the end-to-end QoS.

The incurred delay due to delay jitter smoothing and packet retransmission is perceived by the user as an initial delay. This initial delay is independent of the file size, and is usually much smaller than the delay incurred in downloading the entire file. Hence, by using the scheme of the present invention, the end-to-end QoS is significantly improved in terms of both delay and quality.

Figure 2:
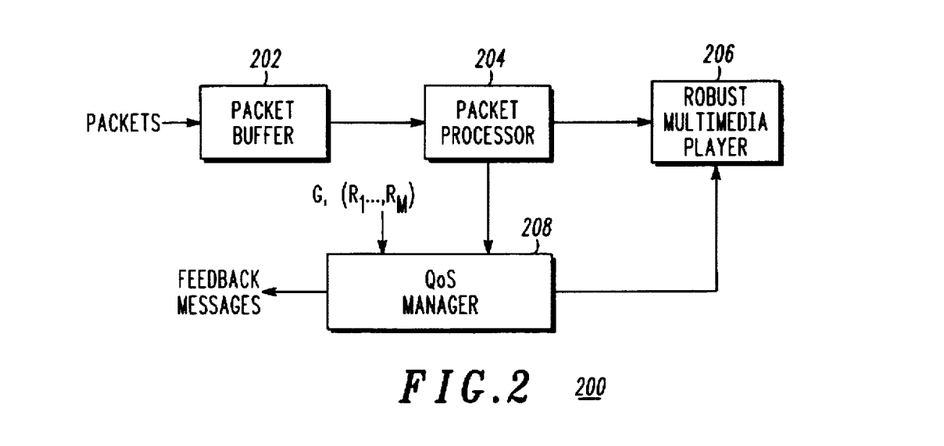
FIG. 2 is a block diagram of one embodiment of a multimedia client device in accordance with the present invention.

FIG. 2, numeral 200, is a block diagram of one embodiment of a multimedia client device in accordance with the present invention. The multimedia client device includes a packet buffer (202), a packet processor (204), a QoS manager (208), and a robust multimedia player (206). The packet buffer (202) is operably coupled to receive a sequence of incoming packets from the underlying transmission device. The packet processor (204) is operably coupled to the packet buffer and is utilized for reordering out-of-sequence received packets, for performing packet loss detection, and for generating a multimedia bitstream from the received packets. The packet processor (204) extracts the sequence number for each packet and determines whether or not packets have arrived in sequence. Sequence numbers are also used for packet loss detection.

Once a packet loss is detected, the packet processor (204) informs the QoS manager which packet has been lost. Because of packet loss, the bitstream produced by the packet processor (204) will generally have "gaps". The QoS manager (208) is operably coupled to the packet processor (204) for receiving the information on lost packets, and for sending control messages, i.e., feedback messages, to the server. One kind of control message is a "retransmission request," which tells the server the identity of the lost packet and the number of copies requested for retransmission. A key aspect of the present invention is the method the QoS manager determines whether or not to request a retransmission, or how many copies to request, based at least on a predetermined bandwidth budget and the estimated information loss rate on the packet network. These decisions may also depend on the importance of the lost packet and the remaining number of allowed retransmission attempts for the packet. The robust multimedia player (206) is operably coupled to the packet processor (204) and the QoS manager (208), and will start to play out the multimedia bitstream output from the packet processor (204) after an initial delay predetermined by the QoS manager (208). The player (206) is robust in the sense that it can conceal some of the effects of unrecovered lost packets.

In one preferred embodiment of the present invention, the retransmission decision is made at the client based at least on the predetermined bandwidth budget and the estimated information loss rate on the packet data network. Furthermore, retransmission decisions may also be made based on the importance of a lost packet and the remaining number of allowed retransmission attempts for the packet. For more important packets, multiple copies of retransmission may be requested in order to increase the probability of correct retransmission, while for less important packets, a single copy retransmission may suffice. The QoS manager (208) may not request any retransmission at all for those less important packets. When the initial playout delay is chosen such that multiple retransmissions may be accommodated for a lost packet, the copy number for retransmission of a lost packet can be adapted to both the importance of the lost packets and the remaining number of allowed retransmission attempts for the packet. For a more important lost packet, the QoS manager (208) may request a single copy of retransmission in the initial few trials, but multiple copies of retransmission in later trials to increase the probability of recovering the lost packet as the time window left for recovering the lost packet is running out. On the other hand, for a less important packet, the QoS manager may still request a single copy of retransmission in the initial few trials, but not request any retransmission at all in later trials, to yield the limited bandwidth to more important packets.

Because of the delay jitter of the packet network, the number of retransmission attempts for each packet will be different in general. At any particular time, the remaining number of retransmission attempts may be determined as follows: once the initial delay is determined, then the presentation time Tp for a given packet is known. For video, the presentation time is the time that it is displayed on the screen while for audio, the presentation time is the time that it is output to the speakers. Let Tc represent the current time when the decision on the number of retransmission copies is to be made. Then the remaining time for recovering the lost packet is Tp−Tc. Let Tr represent the round trip delay from the client to the server, then the remaining number N of retransmission attempts is given by $$N=(Tp-Tc)/Tr.$$

The roundtrip delay Tr may be estimated using methods in the prior art, for example, TCP.

Depending on the information loss rate on the packet s network and the retransmission decision, the overall data rate at the server, which is the sum of the original streaming rate and the retransmission data rate, may be significantly higher than the original streaming rate. Although more retransmission may speed up the recovery of a specific lost packet, excessive data load can overload the packet network and hence increase the information loss rate on the network. Hence it is often desirable to limit the overall data rate at the server to be under a predetermined bandwidth budget. This budget may be predetermined by the link speed from the server to the packet network, or may be selected by a network manager. Hence the QoS manager may also send control messages to the remote server so that less important information will not be streamed from the beginning to facilitate recovering of lost more important packets.

Multimedia information typically consists of two or more media streams (e.g., voice and video). The importance of each media for the perceived service quality by end users is typically different. For example, audio quality is in general more important than video quality. In addition, sophisticated source coding algorithms may further partition information within a given media into different layers of different importance. For example, in MPEG video coding, a so-called I picture is more important than a P picture, which is in turn more important than a B picture (See, e.g., D. Le Gall, "MPEG: a video compression standard for multimedia applications," Communications of the ACM, April 1991). Hence, the original multimedia stream may be viewed as consisting of several substreams, and packetization may be performed in such a way that a packet only contains information from one substream, wherein each substream is identified by using a different substream identifier in the packet header.

According to the retransmission protocol of the present invention, the QoS manager (208) uses the predetermined importance of the lost packet and the remaining number of retransmission attempts for the packet to determine how many copies of retransmission to request for the lost packet, or whether to send a retransmission request at all. In addition, the QoS manager (208) may also send rate control messages to the remote server to facilitate the requested retransmission. The streaming rate and the number of copies of retransmission are chosen in such a way that the overall bitrate at the server does not exceed the predetermined bandwidth budget G.

If the original multimedia data consists of $M \geq 2$ substreams, $R_i$ is the original data rate of substream i, and $c_{ij} \geq 0$ represents the number of copies of a lost packet requested for retransmission for substream i in the jth retransmission attempt, the trade-off between the streaming rates $R'_i$ of the substreams and the number of copies requested for retransmission may be represented more formally according to the following formula:

$$R'+\Sigma_{1 \leq i \leq M}(\Sigma_{1 \leq j \leq L_i} p^j c_{ij})R'_i \leq G, \qquad (1)$$

where $$R'_i \leq R_i$$

and $$R'=\Sigma_{1 \leq i \leq M} R'_i,$$

and p is the information loss rate in the packet network, and $L_i$ is the number of retransmission attempts for substream i. The original data rates $R_i$'s of the substreams are typically carried over from the server to the client at the start of the streaming session along with the bandwidth budget G.

Since p and $L_i$ typically change with time, $R'_i$'s and $C_{ij}$'s must be updated continuously so that the above formula is satisfied. The rate and retransmission control decisions are made by the QoS manager and the desired rates $R'_i$ are fed back to the remote server.

Figure 3:
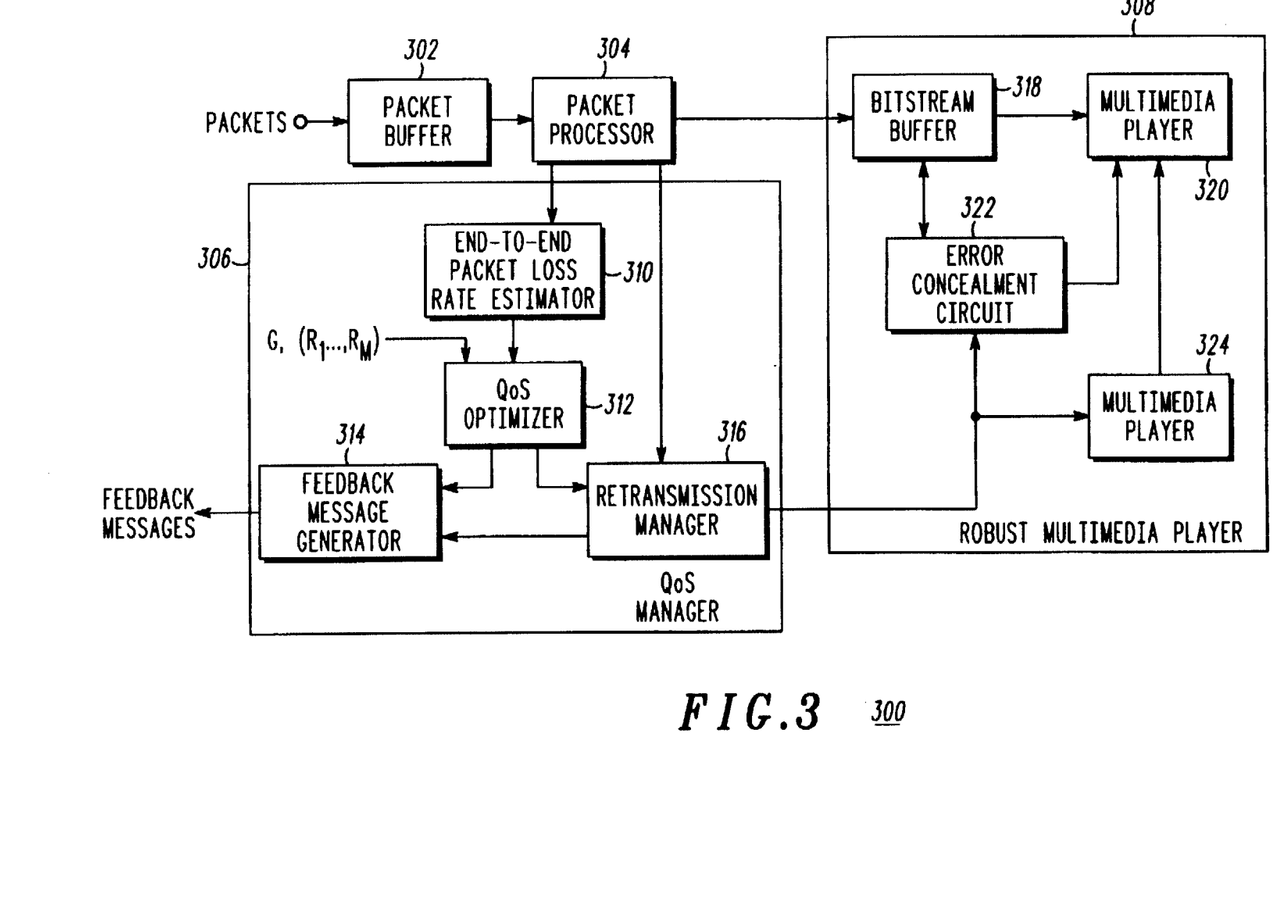
FIG. 3 is a block diagram of the device of FIG. 2 shown with greater particularity.

One embodiment of the client device of FIG. 2 is shown with greater particularity in FIG. 3, numeral 300. In this embodiment, the QoS manager (306) includes an end-to-end packet loss rate estimator (310), a QoS optimizer (312), a feedback message generator (314), and a retransmission manager (316). The packet loss rate estimator (310) is operably coupled to the packet processor (304) and is utilized to estimate the end-to-end packet loss rate from the server to the client. The QoS optimizer (312) is operably coupled to the packet loss rate estimator (310) to provide input to the feedback message generator (314). The function of the QoS optimizer (312) is to determine the number of copies requested of retransmission for a lost packet and the streaming rates for all the substreams so that the relationship in (1) is satisfied. The retransmission manager (316) is operably coupled to the packet processor (304) and the QoS optimizer (312) and is utilized for tracking all active retransmission attempts. The feedback message generator (314) is operably coupled to the QoS optimizer (312) and the retransmission manager (316) for generating and sending feedback messages to the remote server.

The robust multimedia player (308) consists of the following components: a bitstream buffer (318), an error concealment circuit (322), a delay circuit (324) and a multimedia player (320). The bitstream buffer (318) is operably coupled to the packet processor (304) and the error concealment circuit (322) and is utilized for buffering the output bitstream generated from the packet processor (304). The error concealment circuit (322) is operably coupled to the retransmission manager (316) and the bitstream buffer (318) and is utilized for performing error concealment when a retransmission attempt for a lost packet fails. The delay circuit (324) is operably coupled to the retransmission manager (316) and is utilized to generate the initial smoothing delay for use by the multimedia player (320). The multimedia player (320) is operably coupled to the bitstream buffer (318), the error concealment circuit (322), and the delay circuit (324), and is utilized for playing out the bitstream stored in the bitstream buffer (318) after an initial smoothing delay.

Upon detecting a packet loss, the packet processor (304) signals the packet loss to the feedback message generator (314) and, if a retransmission is desired, the feedback message generator (314) sends a retransmission request message to the remote server. The retransmission request message includes at least the sequence number of the lost packet. The retransmission request message may also include the number of copies for retransmission. Multiple copies of the same retransmission request message may be sent to the remote server to increase the probability of success, because the reverse link, in general, also suffers from packet loss. For each retransmission request sent out, a timer is started in the retransmission manager (316). If the retransmitted packet is received by the packet processor (304) prior to the expiration of the corresponding timer, the timer will be cleared. If the timer expires prior to the receipt of the retransmitted packet, the QoS manager (306) may either give up or make another attempt. The number of trials for retransmitting a packet is determined by the method described above.

The delay circuit is used to determine the value of the initial smoothing delay D based on the number N of intended retransmission trials and the delay jitter J in the packet network. The delay jitter of the packet network is the difference between the maximum and the minimum delay which a packet can suffer. It may either be a known value or may be estimated from the packet arrival times using a predetermined method. The initial delay is independent of the original file size. In one embodiment, D is determined, according to the following relationship:

$$D = J + N*T$$

where T is the round-trip delay from the client to the server.

The error concealment circuit is activated when a retransmission attempt fails. The function of the error concealment circuit is to fill in the missing gaps caused by packet loss by exploiting redundancy that exists in real-time audio-visual information and in human perception systems. The error concealment circuit may either modify the bitstream stored in the bitstream buffer so that the multimedia player may decode and present the result directly or assist the multimedia player to handle the error gaps in the stored bitstream in the bitstream buffer, or both. Many error concealment methods for video are known in the state-of-the-art and some of these may be applied here (e.g. see Q.-F. Zhu, et al, "Coding and Cell Loss Recovery for DCT-Based Packet Video", IEEE Trans. CAS Video Technology, pp. 248–258, June 1993).

When the client is connected to the packet network via a low-speed access link, the bandwidth bottleneck lies in the low-speed access link in general. Multimedia information packets are sent by the server at a predetermined streaming rate R bits/sec, where R is a maximum achievable streaming rate, to the packet network which then carries the packets to an access gateway to be fed into a low-speed point-to-point access link for delivery to the client. When the access link is an analog telephone line, voiceband modems are typically used at the access gateway and the client. Other forms of transmission devices may be employed when other digital transmission services, such as ISDN, are used on the access link. In addition to delivering the streaming multimedia information, the local transmission device also delivers selected side information to the client to facilitate the optimization of the streaming protocol, as will be described below.

The maximum achievable streaming rate R depends on the information loss rate (percent of bits lost) on the packet network. Clearly, in the absence of any loss, the streaming rate may be chosen substantially equal to the maximum available bitrate B on the access link. As the information loss rate p on the network increases, one may then increase the streaming rate without creating congestion at the entrance to the low-speed access link, provided the losses on the packet data network occur randomly and no retransmission is used. Thus, if one obtains an estimate of p in the client, one may adapt the streaming rate R to maximize throughput, according to:

$$R \leq B/(1-p).$$

For example, if $p=0.1$, one may stream at a rate R approximately 11% higher than B, as long as the loss rate on the packet network is not affected by moderate increases in the streaming rate. The latter is a reasonable assumption when low-speed streaming multimedia information constitutes a very small portion of the traffic on the packet network.

When retransmission is used, the streaming rate R' must be chosen in such a way that enough additional bandwidth is kept available on the access link to carry the retransmitted packets. According to the present invention, R' may be determined from the information loss rate p on the packet network and the total end-to-end information loss rate q, as follows:

$$R'+qR' \leq B/(1-p). \quad (2)$$

It is interesting to note that according to formula (2), when all information loss occurs on the packet network (i.e., p=q), and $p^2$ is small, the streaming rate may be chosen equal to B. In deriving this formula, it is assumed that for every packet lost, one and only one packet is retransmitted, and only one retransmission is attempted for each lost packet. It is also assumed that every retransmission request sent by the client is correctly received by the server. That means, if one may obtain an estimate of q and p, it is possible to determine the optimal streaming rate R' according to formula (2).

In order to take advantage of the above method, it is necessary to estimate the information loss rate p on the packet network. This can be accomplished in the client by measuring the total end-to-end information loss rate q and the information loss rate p' on the low-speed access link. The quantity p' may be estimated using an error detection code on the point-to-point access link. Such an error detection code is used, for example, in the popular Point-to-Point Protocol (PPP). The method defined in RFC 1333, "PPP Link Quality Monitoring" by W. Simpson and Daydreamer, may be used to estimate p' using the error detection code.

An alternative method to obtain p' is to obtain the information from the transmission device, such as a modem, connected to the client. The modems have the ability to measure bit error rate through a variety of schemes—one method is defined by Qureshi et. al. in U.S. Pat. No. 4,756,007, Adaptive Communication Rate Modem. This gives a direct indication of p'.

The end-to-end information loss rate q may be determined by employing sequence numbers or another error detection code in the end-to-end protocol between the server and client. The information loss rate p on the packet network may then be determined from p' and q according to the following relationship:

$$p=1-(1-q)/(1-p'). \quad (3)$$

According to the retransmission protocol of the present invention, the QoS manager (208) determines the streaming rate and the number of copies of retransmission are chosen in such a way that the overall bitrate at the access gateway does not exceed the capacity of the low-speed access link (Of course, otherwise packets will be dropped at the access gateway, leading to unnecessary quality degradations). The condition may be represented as follows:

$$R+\Sigma_{1 \leq i \leq M}(\Sigma_{1 \leq j \leq L_i} q'c_{ij})R_i \leq B/(1-p), \quad (4)$$

Since the overall data rate at the server has to satisfy (1), the combination of (1) and (4) can be simplified as:

$$R+\Sigma_{1 \leq i \leq M}(\Sigma_{1 \leq j \leq L_i} q'c_{ij})R_i \leq min\{G, B/(1-p)\} \quad (5).$$

Since p, q, Li, and B typically change with time, these parameters must be estimated continuously in order to update $R_i$'s and $C_{ij}$'s so that the above formula is satisfied. The rate and retransmission control decisions are made by the QoS optimizer and the desired rates $R_i$ are fed back to the remote server.

Errors on the low-speed link are typically caused by random bit errors. From the formulas shown above, where p' may be reduced, it may be possible to increase $C_{ij}$'s. There are many ways of delivering error-free data over the low-speed link, for example, by using the error control protocol recommended in ITU-T Recommendation V.42. Unfortunately, the retransmission protocol used in V.42 adds additional delay. Since most errors are expected to occur on the packet network, it is often preferable to disable V.42 on the access link and apply retransmission end-to-end between the client and the server. An alternative way of reducing p' is to reduce the available bitrate on the access link.

Figure 4:
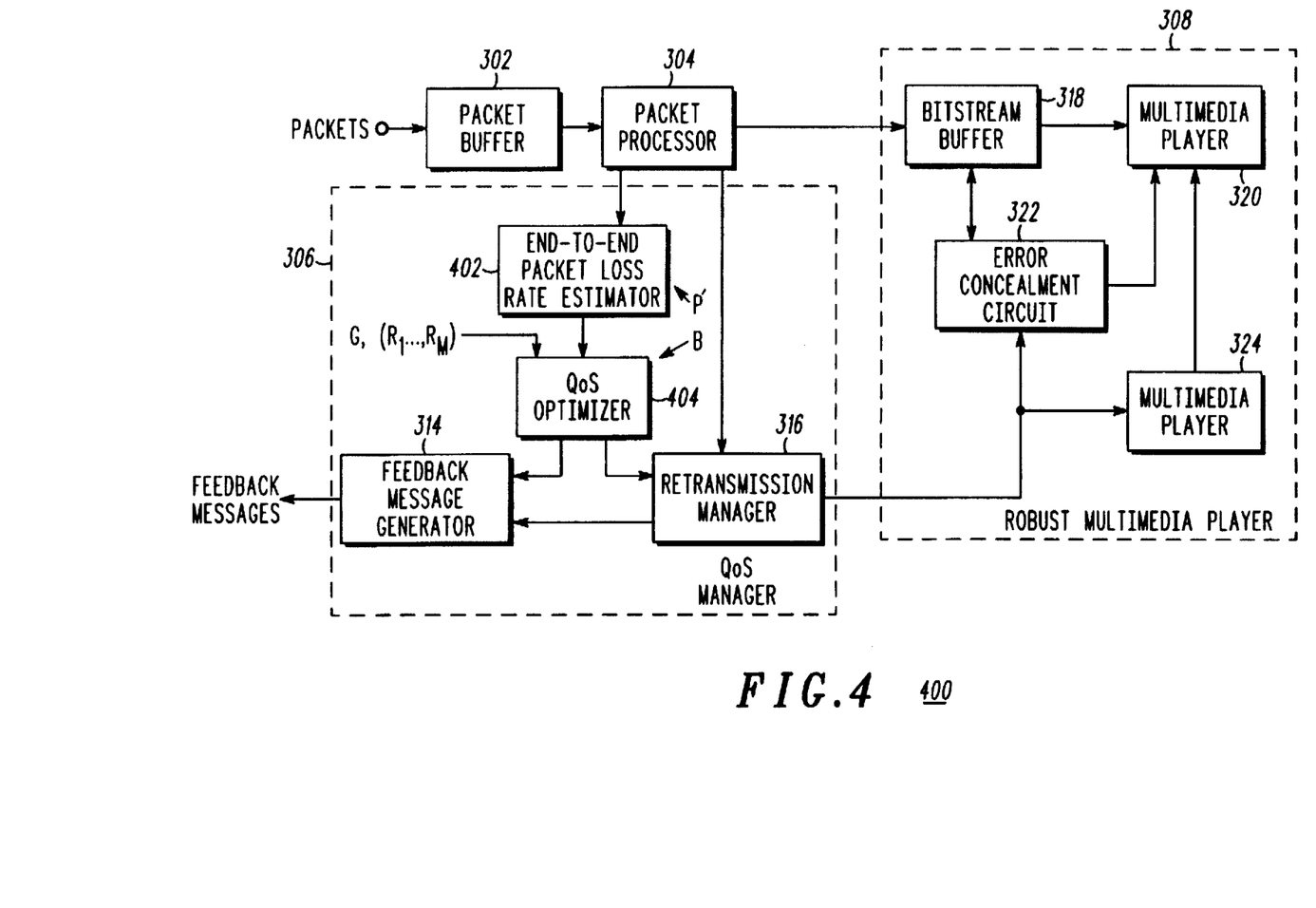
FIG. 4 is a block diagram of the device of FIG. 3 wherein the client is connected to the packet network via a low-speed access link.

FIG. 4, numeral 400, is a block diagram of the device of FIG. 3 wherein the client is connected to the packet network via a low-speed access link. FIG. 4 is different from FIG. 3 in that the packet network loss rate estimator (402) is used to estimate the information loss rate in the packet network according to formula (3). Hence as described above, the estimator first estimates the end-to-end packet loss rate q. With the information loss rate p' on the low-speed access link given by the transmission device, the information loss rate p in the packet network is obtained. The function of the QoS optimizer (404) is also different in that the number of copies of retransmission for a lost packet and the streaming rates are chosen according to formula (5).

Figure 5:
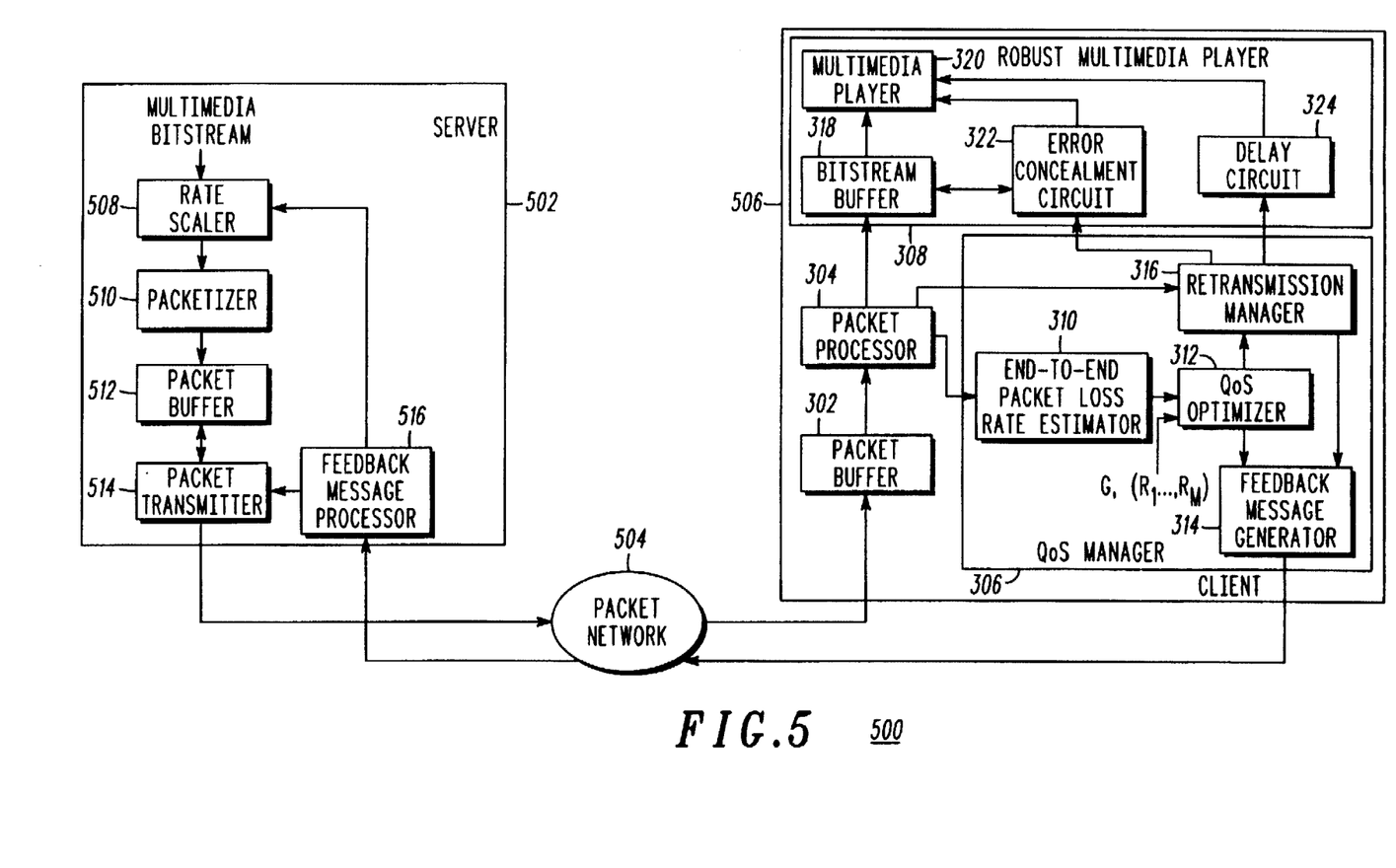
FIG. 5 is a block diagram of one embodiment of a one-way real-time multimedia streaming system utilizing the multimedia client device of FIG. 2 in accordance with the present invention.

FIG. 5, numeral 500, is a block diagram of one embodiment of a one-way realtime multimedia streaming system in accordance with the present invention. The system includes a multimedia server (502), a packet network (504), and a multimedia client (506). The client (506) is the same as that shown in FIG. 3, i.e., includes a packet buffer (302), a packet processor (304), a QoS manager (306) and a robust multimedia player (308), and operates in the manner described above. The server (502) consists of: a rate scaler (508), a packetizer (510), a packet buffer (512), a packet transmitter (514), and a feedback message processor (516). The feedback message processor (516) is operably coupled to receive feedback messages sent by the client (506) and is utilized to decode the received messages. If the received message is a retransmission request message, then the identity of the requested packet and the number of copies for retransmission are passed to the packet transmitter (514), which will fetch the requested packet from the packet buffer (512) and transmits the requested number of copies of the packet to the network. If the received message is a rate control message, then the received message is forwarded to the rate scaler (508).

The rate scaler (508) is operably coupled to receive the original multimedia information, and the requested data rates from the feedback message processor (516). The function of the rate scaler (508) is to reduce the bitrates $R_i$ of the input multimedia substreams to the requested bitrates $R'_i$ for those sub-streams specified by the rate control message. The rate scaler (508) may be implemented by either simply discarding some of the original data or using real-time rate reducing techniques such as the one disclosed by Eyuboglu and Yong in patent application Ser. No. 08/179,020, entitled "Efficient Transcoding Device and Method," filed Jan. 7, 1994.

The packetizer (510) is operably coupled to the rate scaler (508) and is utilized to packetize the output of the rate scaler (508) using a predetermined scheme. The packet buffer (512) is operably coupled to the packetizer (510) and to the packet transmitter (514) and is used to store the output of the packetizer (510). The packet transmitter (514) is operably coupled to the packet buffer (512) and the feedback message processor (516). In normal operation, when there is no output from the feedback message processor (516), the packet transmitter (514) fetches packets from the packet buffer (512) in the sequence the packets are generated and transmits them to the packet network at the same streaming rate as the packets are generated. When a retransmission request is initiated by the feedback message processor (516), then the packet transmitter (514) fetches the packet specified by the retransmission request message and sends the number of copies specified by the feedback message processor (516).

Figure 6:
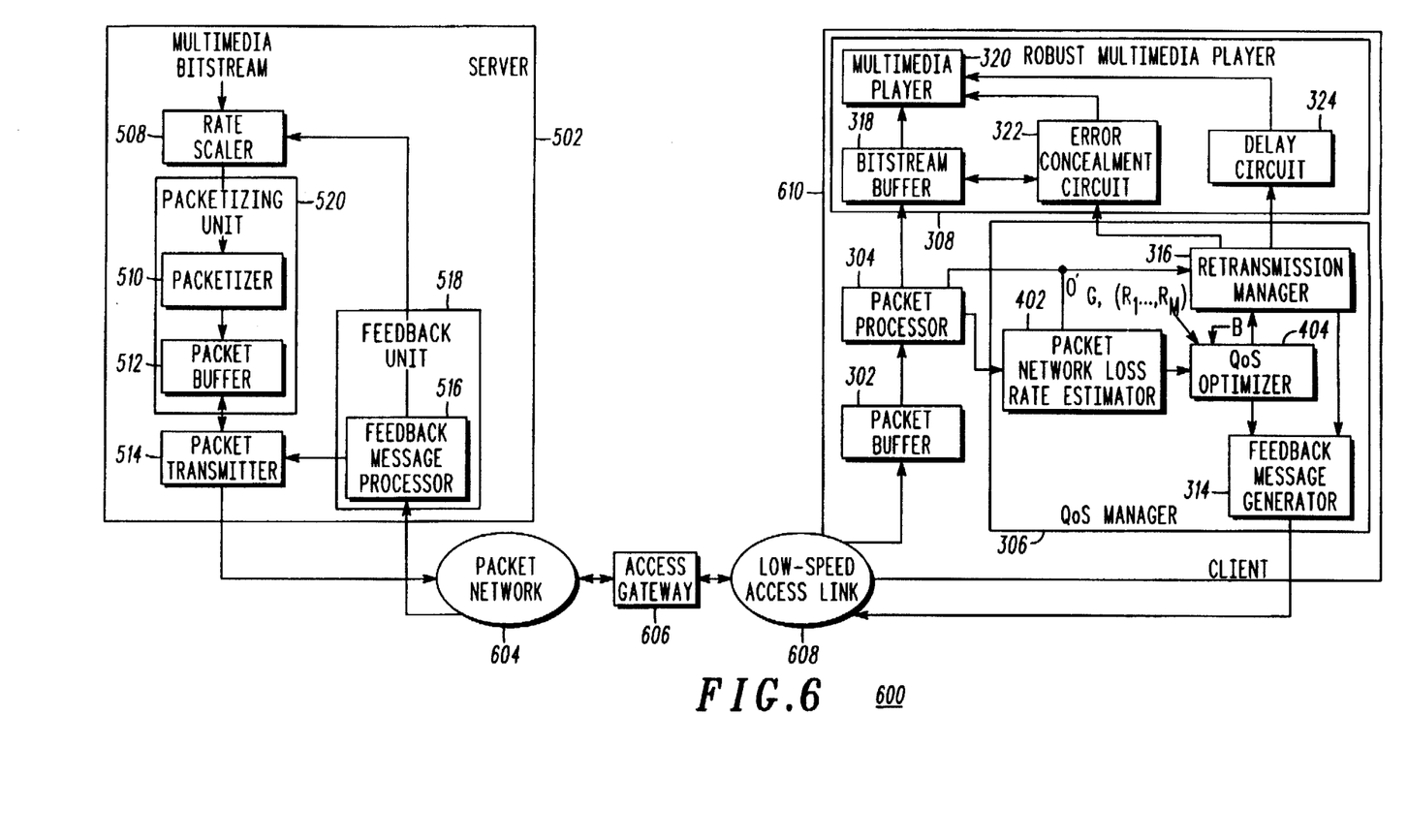
FIG. 6 is a block diagram schematic of a one-way real-time multimedia streaming system of FIG. 5 wherein the client is connected to the packet network via a low-speed access link.

FIG. 6, numeral 600, is a block diagram of a one-way realtime multimedia streaming system of FIG. 5 wherein the client is connected to the packet network via a low-speed access network. The system consists of a server (502), a packet network (604), an access gateway (606), a low-speed access link and a client (608). The server operates in the same way as the server in FIG. 5 while the client operates in the same way as the client in FIG. 4.

Figure 7:
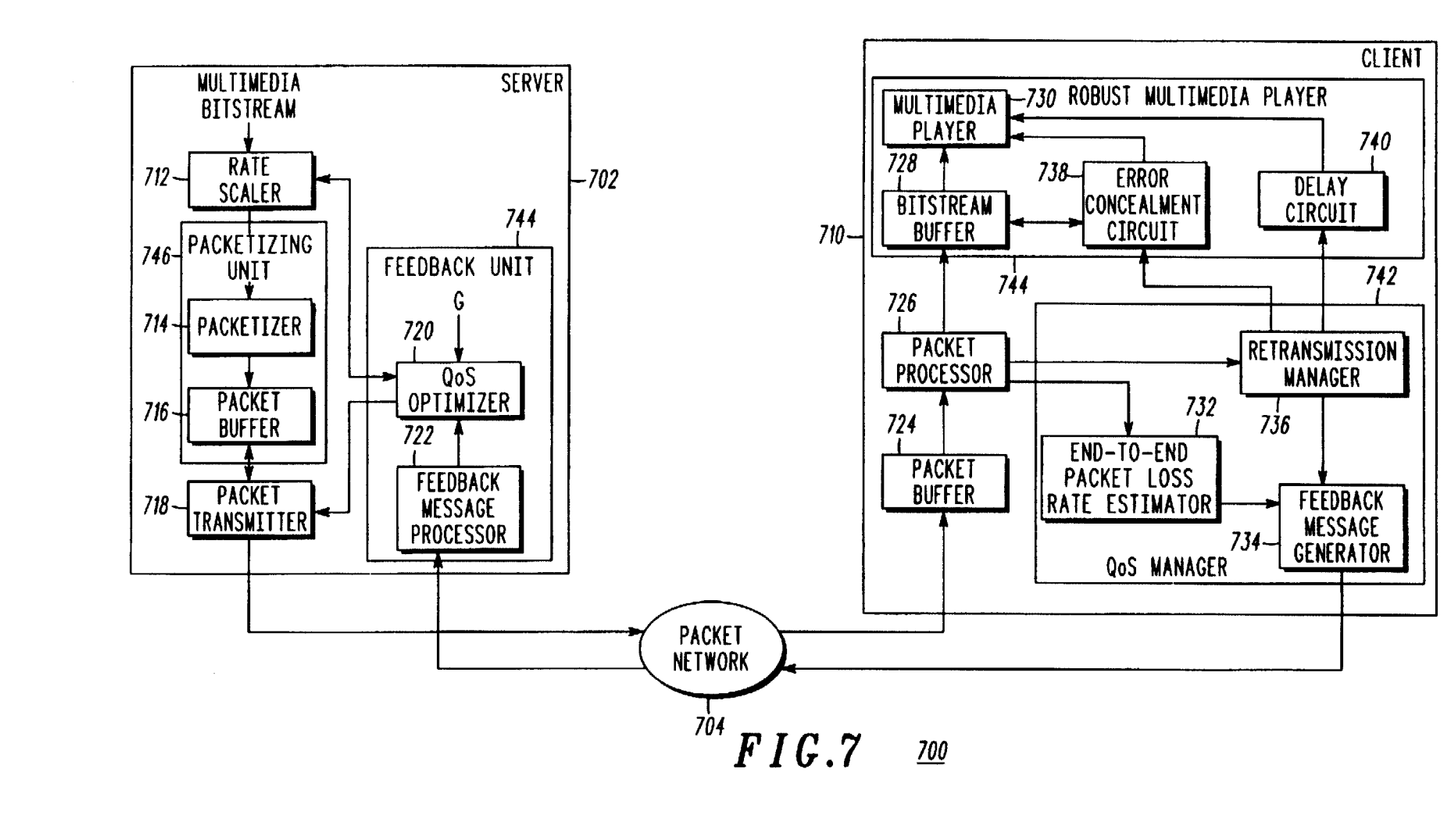
FIG. 7 is a block diagram of another embodiment of a one-way real-time multimedia streaming system in accordance with the present invention.

FIG. 7, numeral 700, is a block diagram of another embodiment of a one-way realtime multimedia streaming system in accordance with the present invention. The system shown in FIG. 7 is different from that shown in FIG. 5 in that the QoS optimizer (720) is moved from the client in FIG. 5 to the server in FIG. 7. The QoS optimizer (720) is coupled to the rate scaler (712), the feedback message processor (722), and to receive G (the bandwidth budget at the server). The packet transmitter (718) is coupled to the QoS optimizer (720) and the packet buffer (716) and is used to transmit packets along the packet network (704). The packetizer (714) is coupled to the rate scaler (712). The robust multimedia player (744) includes a multimedia player (730), a bitstream buffer (728), an error concealment circuit (738), and a delay circuit (740) that are coupled in the same manner and operate in the same manner as the elements of the robust multimedia player (308) of FIG. 3. The packet buffer (724) and the packet processor (726) operate in the same fashion as those in FIG. 5.

The QoS manager (742) of FIG. 7 includes a retransmission manager (736) coupled to the packet processor (726), an end-to-end packet loss rate estimator (732) coupled to the packet processor (726), and a feedback message generator (734) coupled to the packet loss rate estimator (732) and the retransmission manager (736). Hence, when a packet is lost, the packet processor (726) signals the retransmission manager (736) of the packet loss. Then, a retransmission request message is generated and sent on the packet network (704) to the server (702) by the feedback message generator (734).

At the server side, the QoS optimizer (720) makes the decisions of how many copies of retransmission for a requested packet and the streaming rates based on the formula (1). Because the QoS optimization is performed in the server side, the complexity of the client (710) is significantly reduced compared to the client device in FIG. 3.

The available bitrate on the low-speed access link may be provided by a transmission device connected to the low-speed access link. The transmission device may be a voiceband modem. Where selected, the transmission device may have an auxiliary control channel in addition to a data channel through which control information is exchanged between the client device and the transmission device.

Figure 8:
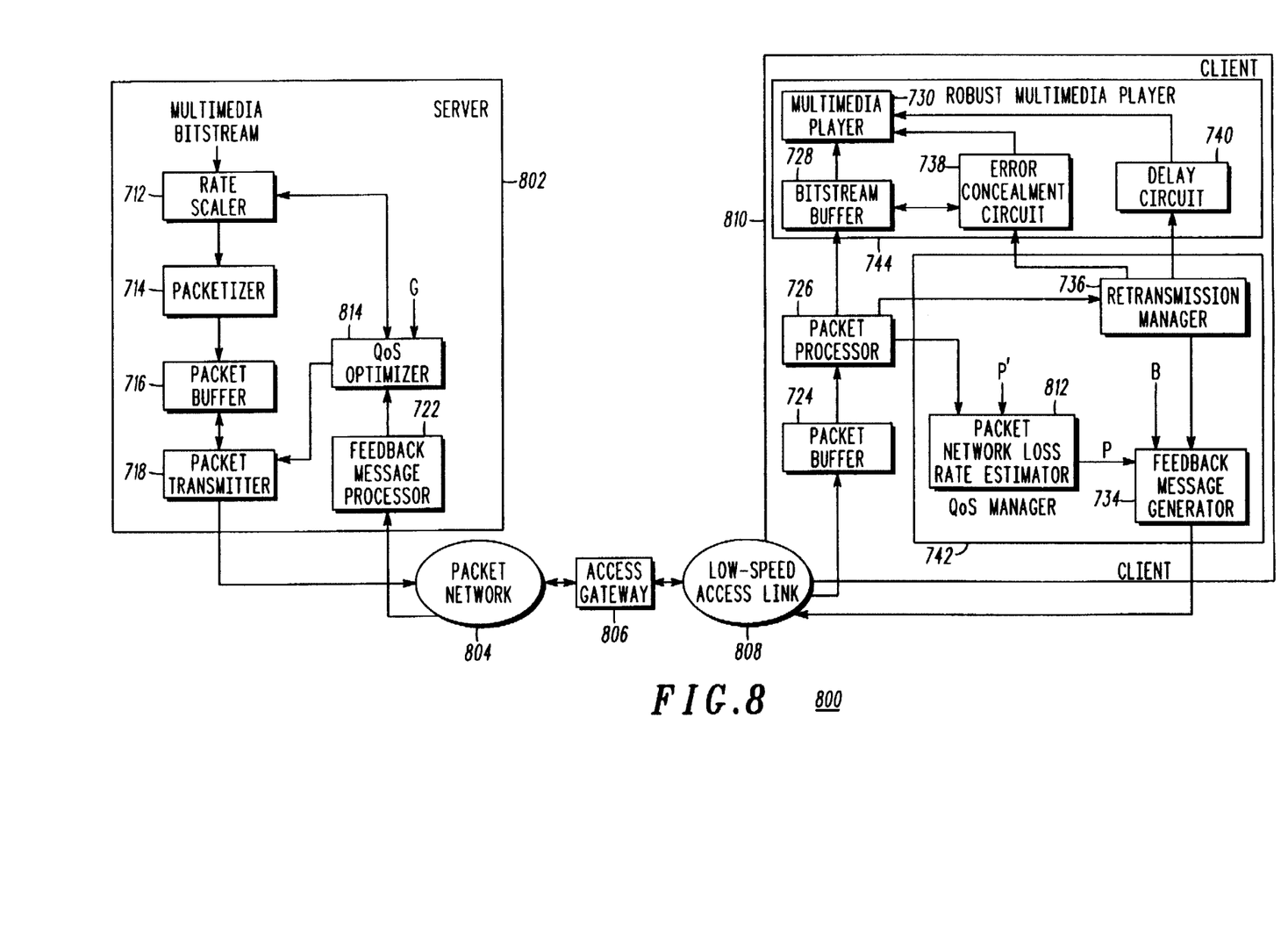
FIG. 8 is a block diagram of a one-way real-time multimedia streaming system of FIG. 7 wherein the client is connected to the packet network via a low-speed access link.

FIG. 8, numeral 800, is a block diagram of a one-way realtime multimedia streaming system of FIG. 7 wherein the client is connected to the packet network via a low-speed access link. The differences between FIG. 8 and FIG. 7 are: in the client, the packet network loss rate estimator (812) estimates the packet loss rate as in FIG. 4 and the bandwidth of the low-speed link B is also sent to the server (802). In the server (802), the QoS optimizer (814) selects the number of copies of retransmission for a lost packet and the streaming rates based on the formula (5).

Figure 9:
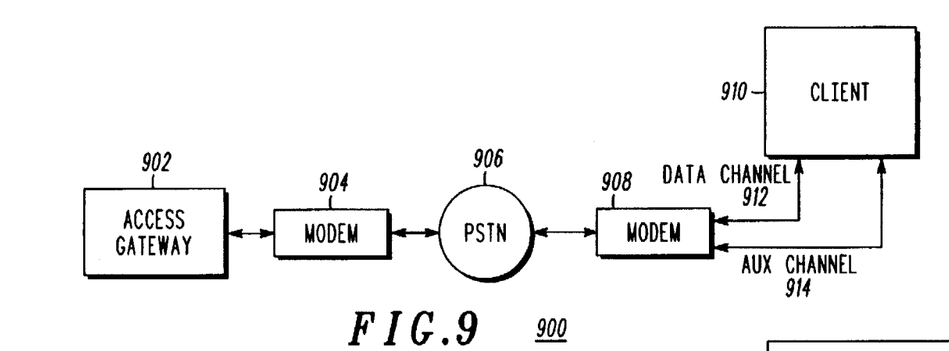
FIG. 9 is a block diagram of the coupling between a modem and the client in accordance with the present invention wherein p' is estimated in the modem and passed to the client.

FIG. 9, numeral 900, details the coupling between a modem (908) and the client (910) in accordance with the present invention wherein p' is estimated in the modem (908) and passed to the client (910). This is accomplished through the use of an auxiliary control channel (914) in addition to the main data channel (912) that connect the client (910) to the modem (908). In the system, an access gateway (902) is connected to another modem (904) that is connected to the public switched telephone network (PSTN) (906). The auxiliary control channel (914) may be implemented as a separate data interface to the modem (908) or share one physical interface and be carried as a multiplexed data stream along with the main channel data. The bit error rate information is continuously updated by the modem (908) and is read periodically by the client (910) for further processing.

Figure 10:
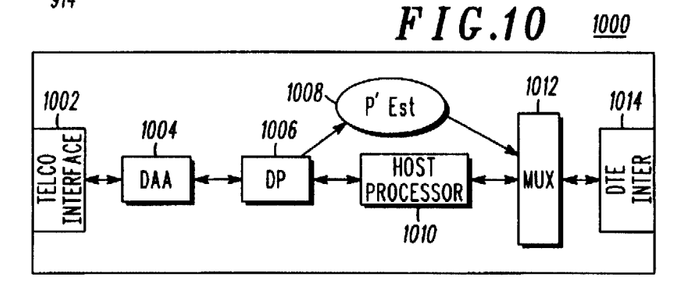
FIG. 10 shows a block diagram of one detailed embodiment of a modem that includes an auxiliary channel MUX and a line error estimator in accordance with the present invention.

FIG. 10, numeral 1000, shows one detailed embodiment of a modem that includes an auxiliary channel multiplexer (MUX) (1012) and an error estimator for p' (p' Est) (1008) in accordance with the present invention. This is done by monitoring the error metrics generated by the data pump (DP) (1006) in the modem and translating this metric into an estimate of the bit error rate p' in the p' estimator (p' Est) (1008). This information is then passed to the multiplexer (MUX) (1012) to be relayed to the client via data terminal equipment (DTE) (1014). A telephone company interface (Telco Int) (1002) is coupled to a DAA (Data Access Arrangement) (1004) that is coupled to the data pump (1006). The data pump (1006) is coupled to a host processor (host proc) (1010) that passes information to the multiplexer (1012).

Figure 11:
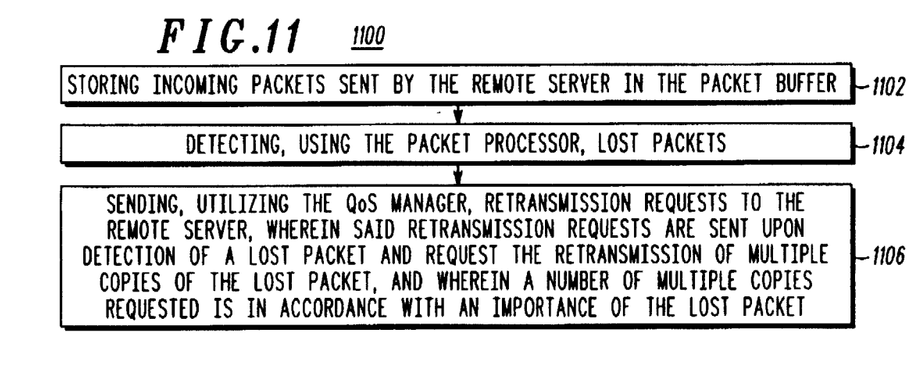
FIG. 11 is a flow chart of one embodiment of steps for a method for, in a client device, receiving and in real-time playing out, by a client device, a multimedia file stored in a remote server in accordance with the present invention, wherein the client device and server are connected to a packet network.

FIG. 11, numeral 1100, is a flow chart of one embodiment of steps for a method for, in a client device, receiving and in real-time playing out, by a client device, a multimedia file stored in a remote server in accordance with the present invention, wherein the client device and server are connected to a packet network, and the client device includes a packet buffer, a packet processor, and a quality of service QoS manager. The method includes the steps of: A) storing (1102) incoming packets sent by the remote server in the packet buffer; B) detecting (1104), using the packet processor, lost packets, and C) sending (1106), utilizing the QoS manager, retransmission requests to the remote server, wherein said retransmission requests are sent upon detection of a lost packet and request the retransmission of multiple copies of the lost packet, and wherein a number of multiple copies requested is in accordance with an importance of the lost packet.

FIG. 12, numeral 1200, is a flow chart showing additional selectable modifications for step C of FIG. 11, in accordance with the present invention. The number of copies requested may be selected to depend on a remaining number of retransmission attempts allowed for the lost packet (1202). The remaining number of retransmission attempts allowed for the lost packet is typically obtained by dividing a difference between a presentation time of the packet and a current time by a round trip delay between the client device and the remote server (1204). The multiple copies of the retransmission request are sent by the client to the remote server (1206). The multiple number of copies requested generally further depends on a bandwidth budget and an end-to-end information loss rate (1208). Where selected, the QoS manager may also send rate control messages to the remote server to control the bitrate of the information stream, wherein said rate control messages are sent using a predetermined scheme based on said retransmission requests, the bandwidth budget and the end-to-end information loss rate (1210). Generally, the number of copies for retransmission and the rate control messages are sent based on the following relationship (1212):

$$R' + \Sigma_{1 \leq i \leq M}(\Sigma_{1 \leq j \leq L_i} q^j c_{ij})R'_i \leq G,$$

where
- M is a number of the substreams the original multimedia file contains;
- $L_i$ is a number of retransmission attempts for substream i;
- q is the end-to-end information loss rate;
- $c_{ij}$ is the number of copies for retransmission for substream i in the jth retransmission attempt;
- $R'_i$ is the streaming bitrate of substream i;
- $R' = \Sigma_{1 \leq i \leq M} R'_i$;
- G is the bandwidth budget at the server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A client device for receiving and in real-time playing out a multimedia file stored in a remote server, said client device and server being connected to a packet network, said client device comprising:
   A) a packet buffer operably coupled to store incoming packets sent by the remote server,
   B) a packet processor operably coupled to the packet buffer for detecting lost packets, and
   C) a quality of service, QoS, manager operably coupled to the packet processor for sending retransmission requests to the remote server, wherein said retransmission requests are sent upon detection of a lost packet and request the retransmission of multiple copies of the lost packet, and wherein a number of multiple copies requested depends on an importance of the lost packet.

2. The client device of claim 1, wherein the number of copies requested further depends on a remaining number of retransmission attempts allowed for the lost packet.

3. The client device of claim 2, wherein the remaining number of retransmission attempts allowed for the lost packet is obtained by dividing a difference between a presentation time of the packet and a current time by a roundtrip delay between the client device and the remote server.

4. The client device of claim 1, wherein multiple copies of the retransmission request are sent by the client to the remote server.

5. The client device of claim 1, wherein the multiple number of copies requested further depends on a bandwidth budget and an end-to-end information loss rate.

6. The client device of claim 1 wherein the QoS manager further sends rate control messages to the remote server to control the bitrate of the information stream, wherein said rate control messages are sent using a predetermined scheme based on said retransmission requests, the bandwidth budget and the end-to-end information loss rate.

7. The client device of claim 6, wherein the said number of copies for retransmission and the rate control messages are sent based on the following relationship:

$$R' + \Sigma_{1 \leq i \leq M}(\Sigma_{1 \leq j \leq L_i} q^j c_{ij}) R'_i \leq G,$$

where
- M is a number of the substreams the original multimedia file contains;
- $L_i$ is a number of retransmission attempts for substream i;
- q is the end-to-end information loss rate;
- $c_{ij}$ is the number of copies for retransmission for substream i in the jth retransmission attempt;
- $R'_i$ is the streaming bitrate of substream i;
- $R' = \Sigma_{1 \leq i \leq M} R'_i$;
- G is the bandwidth budget at the server.

8. A client device for receiving and in real-time playing out a multimedia file stored in a remote server attached to a packet network, said client device being connected to a packet network via a low-speed access link and an access gateway, said client device comprising:
   A) a packet buffer operably coupled to store incoming packets sent by the remote server,
   B) a packet processor operably coupled to the packet buffer for detecting a lost packet, and
   C) a quality of service, QoS, manager operably coupled to the packet processor for sending retransmission requests to the remote server, wherein said retransmission requests are sent based on an available bitrate on the low-speed access link and an information loss rate on the packet network.

9. The client device of claim 8, wherein multiple copies of the lost packet are requested in said retransmission requests, and the number of copies requested depends on an importance of the lost packet.

10. The client device of claim 9, wherein a number of multiple copies requested further depends on a remaining number of retransmission attempts allowed for the lost packet.

11. The client device of claim 10, wherein the remaining number of retransmission attempts allowed for the lost packet is obtained by dividing a difference between a presentation time of a packet and a current time by a roundtrip delay between the client device and the remote server.

12. The client device of claim 9 wherein multiple copies of the retransmission requests are sent by the client to the remote server.

13. The client device of claim 8 wherein the QoS manager further sends rate control messages to the remote server to control the bitrate of the information stream, wherein said rate control messages are sent using a predetermined scheme based on an available bitrate on the low-speed access link and an information loss rate on the packet network.

14. The client device of claim 13, wherein a number of copies for retransmission and the rate control messages are sent based on an equation of a form:

$$R' + \Sigma_{1 \leq i \leq M}(\Sigma_{1 \leq j \leq L_i} q^j c_{ij}) R'_i \leq \min(G, B/(1-p)),$$

where
- M is a number of substreams the multimedia file contains;
- $L_i$ is a number of retransmission attempts for substream i;
- q is an end-to-end information loss rate;
- $c_{ij}$ is a number of copies for retransmission for substream i in a jth retransmission attempt;
- $R'_i$ is a streaming bitrate of substream i;
- $R' = \Sigma_{1 \leq i \leq M} R'_i$;
- G is a bandwidth budget at the server;
- B is a bitrate on the low-speed access link;
- p is an information loss rate on the packet network.

15. The client device of claim 8, wherein the information loss rate on the packet network is determined from an end-to-end information loss rate and an information loss rate on the low-speed access link.

16. The client device of claim 15, wherein said information loss rate on the low-speed access link is obtained using an error detection code.

17. The client device of claim 8, wherein the available bitrate on the low-speed access link is provided by a transmission device connected to the low-speed access link.

18. The client device of claim 17 wherein the said transmission device is a voiceband modem.

19. The client device of claim 17 wherein the transmission device has an auxiliary control channel in addition to a data channel through which control information is exchanged between the client device and the transmission device.

20. The client device of claim 19 wherein the auxiliary channel is used to communicate an estimate of a bit error rate of a low-speed point-to-point access link to the client device.

21. A system for streaming real-time multimedia information from a server to a client device over a packet network, consisting of:
   A) a server for providing a bitstream by streaming the real-time multimedia information and performing retransmission, said server comprising:
      A1) a packetizer for converting the bitstream representing the real-time multimedia information into transmission packets;
      A2) a packet buffer for storing said transmission packets;
      A3) a packet transmitter for transmitting said transmission packets;
      A4) a control message processor for receiving control messages sent by the client device and for initiating retransmission of multiple copies of a packet upon receipt of a retransmission request from the client device;
   B) a packet network operably connected to the server, for carrying the bitstream to a client device;
   C) a client device having a multimedia player for playing out the bitstream in realtime, said client device comprising:
      C1) a packet buffer operably coupled to store incoming packets of the multimedia stream;
      C2) a packet processor, operably coupled to the packet buffer, for detecting lost packets, and
      C3) a quality of service, QoS, manager operably coupled to the packet processor for sending retransmission requests to the remote server, wherein said retransmission requests are sent upon detection of a lost packet and request retransmission of multiple copies of the lost packet, wherein a number of copies requested depends on an importance of the lost packet.

22. The system of claim 21 wherein the number of copies requested by a client further depends on a remaining number of retransmission attempts allowed for the lost packet.

23. The system of claim 21 wherein multiple copies of the retransmission request are sent by the client device to the remote server.

24. The system of claim 21 wherein the number of copies requested by the client device further depends on a bandwidth budget and an end-to-end information loss rate.

25. The system of claim 21 wherein the QoS manager in the client device further sends rate control messages to the server to control a bitrate of the information stream, wherein said rate control messages are sent using a predetermined scheme based on said retransmission requests, a predetermined bandwidth budget and the end-to-end information loss rate.

26. A system for streaming real-time multimedia information stored in a remote server attached to a packet network, to a client device connected to the packet network via a low-speed access link and an access gateway, consisting of:
   A) a server for providing a bitstream by streaming the real-time multimedia information and performing retransmission, said server comprising:
      A1) a packetizer for converting the bitstream representing the real-time multimedia information into transmission packets;
      A2) a packet buffer for storing said transmission packets;
      A3) a packet transmitter for transmitting said transmission packets;
      A4) a control message processor for receiving control messages sent by the client device and for initiating the retransmission of a packet upon receipt of a retransmission request from the client device;
   B) a packet network operably connected to the server, for carrying the bitstream to a client device;
   C) a client device having a multimedia player for playing out the bitstream in realtime, said client device comprising:
      C1) a packet buffer operably coupled to store incoming packets of the bitstream;
      C2) a packet processor, operably coupled to the packet buffer, for detecting lost packets, and
      C3) a quality of service, QoS, manager operably coupled to the packet processor for sending retransmission requests to the remote server, wherein said retransmission requests are sent based on an available bitrate on the low-speed access link and an information loss rate on the packet network.

27. The system of claim 26, wherein multiple copies of a lost packet are requested in said retransmission request sent by the client device, and a number of copies requested depends on an importance of the lost packet, and the server in response initiates retransmission of multiple copies of a requested packet.

28. The system of claim 27 wherein the number of copies requested by the client device further depends on a remaining number of retransmission attempts allowed for the lost packet.

29. The system of claim 27 wherein multiple copies of the retransmission request are sent by the client device to the remote server.

30. The system of claim 26 wherein the QoS manager in the client device further sends rate control messages to the remote server to control a bitrate of the bitstream, wherein said rate control messages are sent using a predetermined scheme based on an available bitrate on the low-speed access link and an information loss rate on the packet network.

31. The system of claim 30, wherein the said information loss rate on the packet network is determined from an end-to-end information loss rate and an information loss rate on the low-speed access link.

32. The system of claim 31, wherein said information loss rate on the low-speed access link is obtained using an error detection code on a point-to-point access link.

33. The system of claim 26, wherein said available bitrate on the low-speed access link is provided by a transmission device connected to a low-speed access link.

34. The system of claim 33 wherein the said transmission device is a voiceband modem.

35. A system for streaming real-time multimedia information from a server to a client device over a packet network, consisting of:

A) a server for providing a bitstream by streaming the real-time multimedia information and performing retransmission, said server comprising:

A1) a packetizer for converting the bitstream representing the real-time multimedia information into transmission packets;

A2) a packet buffer for storing said transmission packets;

A3) a packet transmitter for transmitting said transmission packets;

A4) a quality of service, QoS, optimizer for receiving control messages sent by the client device and for initiating the retransmission of multiple copies of a packet upon receipt of a retransmission request from the client device and for determining how many copies of a lost packet to transmit based on an importance of the lost packet;

B) a packet network operably connected to the server, for carrying the bitstream to a client device;

C) a client device having a multimedia player for playing out the bitstream in real-time, said client device comprising:

C1) a packet buffer operably coupled to store incoming packets of the bitstream;

C2) a packet processor, operably coupled to the packet buffer, for detecting lost packets, and C3) a QoS manager operably coupled to the packet processor for sending retransmission requests to the remote server, wherein said retransmission requests are sent upon detection of a lost packet.

36. The system of claim 35 wherein a number of copies of the retransmitted packet sent by the server further depends on a remaining number of retransmission attempts allowed for the lost packet.

37. The system of claim 35 wherein multiple copies of the retransmission request are sent by the client device to the server.

38. The system of claim 35 wherein a number of copies sent by the server further depends on a bandwidth budget and an end-to-end information loss rate provided by the client device.

39. The system of claim 35 wherein the QoS optimizer in the server further controls the bitrate of the information stream using a predetermined scheme based on said retransmission requests, the bandwidth budget and the end-to-end information loss rate provided by the client.

40. A system for streaming real-time multimedia information stored in a remote server attached to a packet network, to a client device connected to the packet network via a low-speed access link and an access gateway, consisting of:

A) the remote server for providing a bitstream by streaming the real-time multimedia information and performing retransmission, said remote server comprising:

A1) a packetizer for converting the bitstream representing the real-time multimedia information into transmission packets;

A2) a packet buffer for storing said transmission packets;

A3) a packet transmitter for transmitting said transmission packets; and

A4) a QoS optimizer for receiving control messages sent by the client device and for initiating the retransmission of a packet upon receipt of a retransmission request from the client device based on information on an available bitrate on the low-speed access link and an information loss rate on the packet network received from the client device;

B) a packet network operably connected to the remote server, for carrying the bitstream to a client device;

C) a client device having a multimedia player for playing out the bitstream in realtime, said client device comprising:

C1) a packet buffer operably coupled to store incoming packets of the bitstream;

C2) a packet processor, operably coupled to the packet buffer, for detecting lost packets, and C3) a QoS manager operably coupled to the packet processor for sending retransmission requests and information on an available bitrate on the low-speed access link and an information loss rate on the packet network to the remote server.

41. The system of claim 40, wherein multiple copies of a lost packet requested by the client device is sent by the remote server, and a number of copies sent depends on an importance of the lost packet.

42. The system of claim 41 wherein the number of copies sent by the remote server further depends on a remaining number of retransmission attempts allowed for the lost packet.

43. The system of claim 41 wherein multiple copies of a retransmission request are sent by the client device to the remote server.

44. The system of claim 40 wherein the QoS optimizer in the server further controls a bitrate of the bitstream using a predetermined scheme based on an available bitrate on the low-speed access link and an information loss rate on the packet network provided by the client device.

45. The system of claim 40, wherein the said information loss rate on the packet network is determined by the client device from an end-to-end information loss rate and an information loss rate on the low-speed access link.

46. The system of claim 45, wherein said information loss rate on the low-speed access link is obtained using an error detection code.

47. The system of claim 40, wherein the said available bitrate on the low-speed access link is provided by a transmission device connected to the low-speed access link.

48. The system of claim 47 wherein the said transmission device is a voiceband modem.

49. A method for receiving and in real-time playing out, by a client device, a multimedia file stored in a remote server, wherein the client device and server are connected to a packet network, and the client device includes a packet buffer, a packet processor, and a quality of service QoS manager, comprising the steps of:

A) storing incoming packets sent by the remote server in the packet buffer,

B) detecting lost packets using the packet processor, and

C) sending, utilizing the QoS manager, retransmission requests to the remote server, wherein said retransmission requests are sent upon detection of a lost packet and requesting the retransmission of multiple copies of the lost packet, and wherein a number of multiple copies requested is in accordance with an importance of the lost packet.

50. The method of claim 49, wherein the number of multiple copies requested further depends on a remaining number of retransmission attempts allowed for the lost packet.

51. The method of claim 50, wherein the remaining number of retransmission attempts allowed for the lost packet is obtained by dividing a difference between a presentation time of the packet and a current time by a roundtrip delay between the client device and the remote server.

52. The method of claim 49, wherein multiple copies of the retransmission request are sent by the client device to the remote server.

53. The method of claim 49, wherein the multiple number of copies requested further depends on a bandwidth budget and an end-to-end information loss rate.

54. The method of claim 49, wherein the QoS manager further sends rate control messages to the remote server to control the bitrate of the bitstream, wherein said rate control messages are sent using a predetermined scheme based on said retransmission requests, the bandwidth budget and an end-to-end information loss rate.

55. The method of claim 54, wherein said number of multiple copies for retransmission and the rate control messages are sent based on an equation of a form:

$$R' + \Sigma_{1 \leq i \leq M}(\Sigma_{1 \leq j \leq L_i} q^j c_{ij}) R'_i \leq G,$$

where

M is a number of the substreams the original multimedia file contains;

$L_i$ is a number of retransmission attempts for substream i;

q is an end-to-end information loss rate;

$c_{ij}$ is a number of copies for retransmission for substream i in a jth retransmission attempt;

$R'_i$ is a streaming bitrate of substream i;

$R' = \Sigma_{1 \leq i \leq M} R'_i$;

G is a bandwidth budget at the server.

56. A server for transmitting a multimedia file stored in the server to a client device, said client device and the server being connected to a packet network, said server comprising:

A) a rate scaler, operably coupled to receive the multimedia file and for providing an output of input multimedia substreams with requested data bitrates;

B) a packetizing unit, operably coupled to the rate scaler, for packetizing and storing the output of the rate scaler using a predetermined scheme, C) a packet transmitter, operably coupled to the packetizing unit and a feedback unit, for, where the feedback unit lacks an output, fetching packets from the packetizing unit in a sequence generated and transmitting the packets to the packet network at a streaming rate substantially equal to a requested data bitrate, and where a retransmission request is initiated by the feedback unit, fetching a packet specified by a retransmission request and sending a requested number of copies of the packet; and D) the feedback unit, operably coupled to send the multimedia file to the packet transmitter, receive and decode feedback messages and one of: signaling the packet transmitter to retransmit a requested number of copies of a packet and forwarding a received message to the rate scaler.

57. The server of claim 56 wherein the feedback unit is a feedback message processor.

58. A server for transmitting a multimedia file stored in the server to a client device, said client device and the server being connected to a packet network, said server comprising:

A) a rate scaler, operably coupled to receive the multimedia file and for providing an output of input multimedia substreams with requested data bitrates;

B) a packetizing unit, operably coupled to the rate scaler, for packetizing and storing the output of the rate scaler using a predetermined scheme, C) the packet transmitter, operably coupled to the packetizing unit and a QoS optimizer, for transmitting packets along the packet network;

D) a feedback unit, operably coupled to the packet network, the rate scaler, and to receive a predetermined bandwidth budget G, for at least receiving and decoding feedback messages and one of: signaling the packet transmitter to retransmit a requested number of copies of a packet and forwarding a received message to the rate scaler.

59. The server of claim 58 wherein the feedback unit includes:

A) a QoS optimizer, operably coupled to the rate scaler, a feedback message processor, and to receive a predetermined bandwidth budget G, for, where data for a multimedia file consists of M substreams, M an integer greater than or equal to two, $R_i$ is an original data rate of substream i, and $c_{ij} \geq 0$ represents a number of copies of a lost packet requested for retransmission for substream i in a jth retransmission attempt, optimizing transmittal of packets in accordance with an optimizing scheme that provides a trade-off between streaming rates $R'_i$ of substreams and the number of copies requested for retransmission according to an equation of a form:

$$R' + \Sigma_{1 \leq i \leq M}(\Sigma_{1 \leq j \leq L_i} p^j c_{ij}) R'_i \leq G,$$

where $$R'_i \leq R_i$$

and $$R' = \Sigma_{1 \leq i \leq M} R'_i,$$

and p is an information loss rate in the packet network, and $L_i$ is a number of retransmission attempts for substream i; and B) a feedback message processor, operably coupled to send the multimedia file to the packet transmitter for transmission to the client device via the packet network, receive feedback messages sent by the client device via the packet network and decode the feedback messages, wherein, B1) where the feedback message is a retransmission request message, the feedback message processor passes the identity of the requested packet and the number of copies for retransmission to the packet transmitter, which fetches the requested packet from the packet buffer and transmits the requested number of copies of the packet to the packet network;

B2) where the received message is a rate control message, the feedback message processor forwards the received message to the rate scaler.

* * * * *